(12) United States Patent
Kondo et al.

(10) Patent No.: US 8,108,408 B2
(45) Date of Patent: Jan. 31, 2012

(54) IMAGE RECOGNITION DEVICE AND IMAGE RECOGNITION METHOD

(75) Inventors: Satoshi Kondo, Kyoto (JP); Aki Yoneda, Osaka (JP); Ko Mizuno, Kyoto (JP); Takashi Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 285 days.

(21) Appl. No.: 12/521,891

(22) PCT Filed: Jun. 12, 2008

(86) PCT No.: PCT/JP2008/001495
§ 371 (c)(1),
(2), (4) Date: Jul. 1, 2009

(87) PCT Pub. No.: WO2008/152805
PCT Pub. Date: Dec. 18, 2008

(65) Prior Publication Data
US 2010/0077003 A1      Mar. 25, 2010

(30) Foreign Application Priority Data
Jun. 14, 2007   (JP) ................................. 2007-157207

(51) Int. Cl.
*G06F 7/00* (2006.01)
(52) U.S. Cl. ...................................................... 707/749
(58) Field of Classification Search .................. 707/705, 707/706, 732, 728, 749
See application file for complete search history.

(56) References Cited

U.S. PATENT DOCUMENTS

| 7,474,759 | B2 * | 1/2009 | Sternberg et al. | 382/100 |
| 2002/0168117 | A1 * | 11/2002 | Lee et al. | 382/305 |
| 2005/0162523 | A1 * | 7/2005 | Darrell et al. | 348/211.2 |
| 2005/0278379 | A1 | 12/2005 | Nakazawa | |
| 2007/0133064 | A1 * | 6/2007 | Itogawa et al. | 358/403 |

FOREIGN PATENT DOCUMENTS

JP        2005-352782        12/2005

OTHER PUBLICATIONS

International Search Report issued July 8, 2008 in the International (PCT) Application of which the present application is the U.S. National Stage.
Tabata et al., "Hana no Gazo Kensaku System to Kensaku Hoho no Hyoka", IEICE Technical Report, Feb. 18, 2005, vol. 104, No. 668, pp. 1-6.

(Continued)

*Primary Examiner* — Amy Ng
(74) *Attorney, Agent, or Firm* — Wenderoth, Lind & Ponack, L.L.P.

(57) ABSTRACT

An image recognition device includes: an image input unit obtaining an input image corresponding to a target image to be recognized; a similar image search unit searching out at least one similar image similar to the target image obtained by the image input unit from among images generated independently of the image recognition device, and unintentionally obtained; a keyword extraction unit extracting a plurality of keywords corresponding to candidates for a recognition result of the target image; a keyword analysis unit determining at least one likely keyword likely to be the recognition result of the target image from among the plurality of keywords extracted by the keyword extraction unit by analyzing the plurality of keywords; and a presentation unit outputting at least one likely keyword determined by the keyword analysis unit, as the recognition result of the target image.

11 Claims, 16 Drawing Sheets

OTHER PUBLICATIONS

Takeuchi et al., "Ruiji Gazo to Keyword o Riyo shita Web Gazo no Setsumeibun Chushutsu", Information Processing Society of Japan Kenkyu Hokoku, Jan. 13, 2006, vol. 2006, No. 1, pp. 7-12.

D.A. Forsyth et al., "Computer Vision: A Modern Approach", 2002, pp. 495-537, 590-595.

* cited by examiner

FIG. 14
(a) 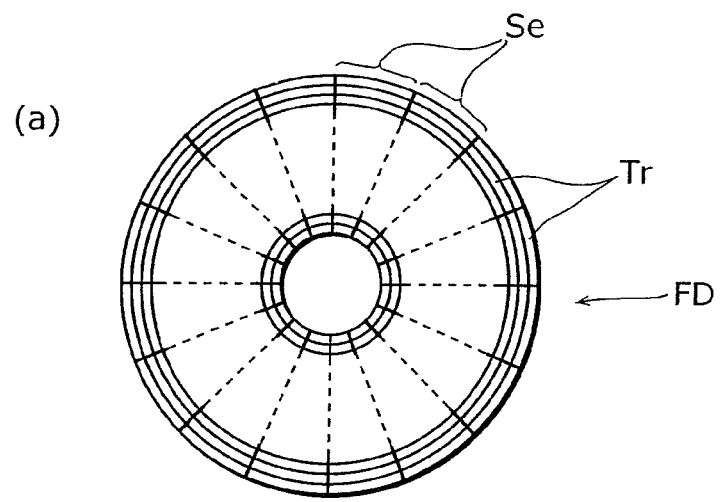
(b) 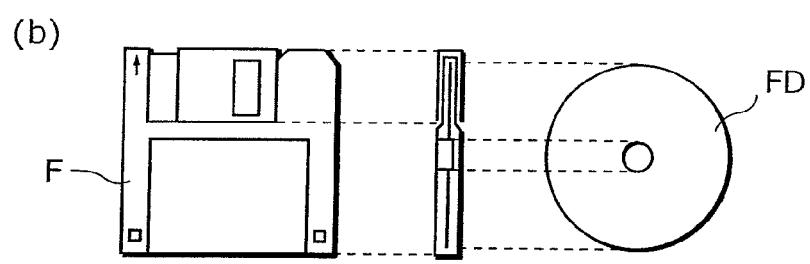
(c) 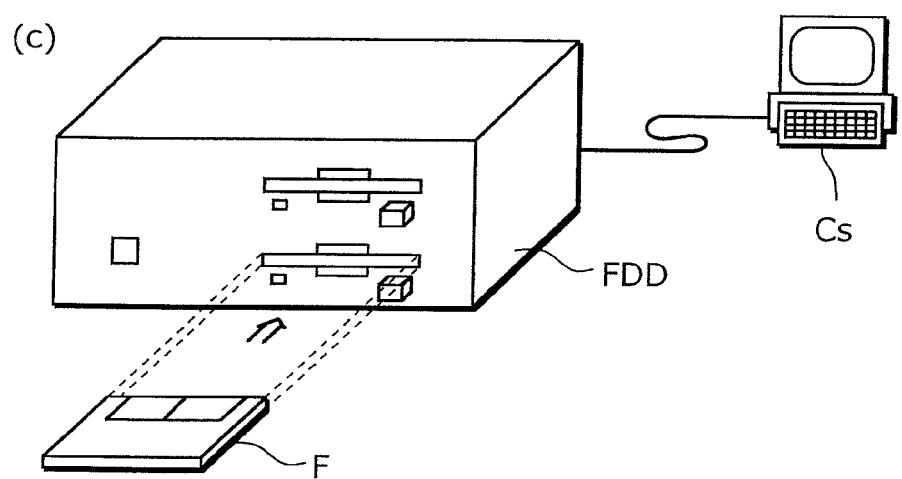

IMAGE RECOGNITION DEVICE AND IMAGE RECOGNITION METHOD

TECHNICAL FIELD

The present invention relates to an image recognition device which recognizes an object shot in a still image or a video.

BACKGROUND ART

A principal technique in image recognition is a template matching (for example, see Non-patent Reference 1). The template matching is a method for preparing, in advance, image windows (templates) each having a various specific shape, applying one of the templates to a target image to be recognized, and testing whether or not a matching object is present in the target image.

More specifically, as shown in FIG. 1, a conventional image recognition device 100 includes an image input unit 101 which obtains the target image, a database (database for recognition) 103 exclusive for image recognition, a recognition unit 102 which performs recognition processing by verifying the target image obtained by the image input unit 101 with the templates in the database for recognition, and a presentation unit 104 which outputs the result of recognition. The conventional image recognition device like this has been proved successful in face recognition according to such template matching.

Non-patent Reference 1: D. A. Forsyth and J. Ponce, "COMPUTER VISION: A Modern Approach", Clauses 22 and 24.3

DISCLOSURE OF INVENTION

Problems that Invention is to Solve

However, the conventional image recognition device according to the template matching involves problems indicated below.

As a first problem, it is impossible to perform image recognition when a database for recognition (a set of templates prepared in advance) does not include an image corresponding to a target image to be recognized. In other words, only an object held in the database for recognition can be recognized.

A second problem, which relates to the first problem, is that the number of templates to be held in the database for recognition must be increased with an increase in the number of target objects to be recognized. The issue is not the size of the database for recognition, but how the image recognition system using the image recognition method makes such database for recognition.

The present invention has been made to solve these conventional problems, and has an object to provide an image recognition device and the like which eliminates the necessity of re-making a database for recognition, that is, eliminates the necessity of managing the database for recognition.

Means to Solve the Problems

In order to achieve the above-described object, an image recognition device according to an aspect of the present invention outputs, as a recognition result, information indicating what an input image is, and includes: an image input unit configured to obtain the input image which is a target image to be recognized; a similar image search unit configured to search out at least one similar image which is similar to the target image obtained by the image input unit from among images generated independently of the image recognition device, stored in a server device accessible via the Internet, and unintentionally obtained; a keyword extraction unit configured to extract a plurality of keywords which are candidates for a recognition result of the target image, from attached information which is attached to at least one similar image searched out by the similar image search unit; a keyword analysis unit configured to determine at least one likely keyword which is likely to be the recognition result of the target image from among the plurality of keywords extracted by the keyword extraction unit by analyzing the plurality of keywords; and a presentation unit configured to output at least one likely keyword determined by the keyword analysis unit, as the recognition result of the target image. Since the image recognition device does not include a database exclusive for image recognition unlike the conventional image recognition devices, there is no need to re-make or manage such database for recognition.

Here, the similar image search unit may be configured to search out an image included in an Exif file as at least one similar image, and the keyword extraction unit may be configured to extract the plurality of keywords from header information in the Exif file.

The similar image search unit may be configured to search out at least one similar image from a Web page on the server device, and the keyword extraction unit may be configured to extract the plurality of keywords using, as a clue, tag information included in either the Web page or an other Web page associated with the Web page.

The similar image search unit may be configured to search out at least one similar image from a Web page on the server device, and the keyword extraction unit may be configured to extract, as each of the plurality of keywords, a peripherally-positioned word or phrase included in the Web page or an other Web page associated with the Web page.

As judgment standards for image recognition, the keyword extraction unit may be configured to extract the plurality of keywords, allowing overlap, and the keyword analysis unit may be configured to analyze the appearance frequency of each of the plurality of keywords extracted by the keyword extraction unit, and determine, as the recognition result, at least one keyword which is a majority among the plurality of keywords.

The similar image search unit may be configured to search out images similar to the target image as at least one similar image, and calculate the degree of similarity between each of the similar images and the target image, and the keyword analysis unit may be configured to associate each of the plurality of keywords extracted by the keyword extraction unit with the degree of similarity that the similar image search unit has calculated for a corresponding similar image with the keyword among the searched-out similar images, and determine, as the recognition result, at least one of the plurality of keywords which has a high degree of similarity.

The keyword extraction unit may be configured to extract the plurality of keywords, allowing overlap, and the keyword analysis unit may be configured to analyze the appearance frequency of each of the plurality of keywords extracted by the keyword extraction unit, and determine, as the recognition result, at least one keyword which is a majority among the plurality of keywords and has the high degree of similarity.

In addition, as for display of recognition results, the keyword analysis unit may be configured to determine, as the recognition results, at least two keywords among the plurality of keywords, at least two keywords each of which is a majority among the plurality of keywords and has a high degree of similarity, and the presentation unit may be configured to display and output at least two keywords determined by the keyword analysis unit in a descending order of the numbers or degrees of similarity of the respective at least two keywords.

It is preferable that the image recognition device further includes an image specification unit configured to obtain a specification of a target area to be recognized within the target image obtained by the image input unit, and that the similar image search unit is configured to search out at least one similar image similar to a sub-image included in the target area obtained by the image specification unit. This makes it possible to narrow down target sub-image candidates to be recognized, thereby reducing noise (not required to be recognized) included in the target image to achieve highly accurate image recognition.

It is preferable that the image recognition device further includes: a classification database in which information indicating an association between each of image templates and a category of the image template are stored; and a simple classification unit configured to determine the category of the target image by verifying the target image obtained by the image input unit with each of the image templates stored in the classification database, and that the similar image search unit is configured to search out at least one similar image which is similar to the target image and belongs to the category obtained as a result of the category determination made by the simple classification unit, using the result of the category determination as a keyword for search. Additionally using such category information as supplemental information in the search of at least one similar image produces an advantageous effect of increasing the accuracy in searching at least one similar image and saving the search time, compared with the case of searching a similar image based on only the target image.

In addition, it is preferable that the image recognition device further includes: a detailed information database in which attached information of each of target image candidates and detailed information of the attached information are stored in an associated manner; and a pre-processing unit configured to obtain the attached information attached to the target image obtained by the image input unit, and obtain the detailed information of the attached information attached to the target image obtained by the image input unit by verifying the obtained attached information with the attached information registered in the detailed information database, and that the similar image search unit is configured to search out at least one similar image which is similar to the target image and relates to the detailed information obtained by the pre-processing unit using the detailed information as a keyword for search. Additionally using such information other than at least one similar image as supplemental information in the search of at least one similar image produces an advantageous effect of increasing the accuracy in searching at least one similar image and saving the search time, compared with the case of searching similar images based on only the target image.

It is to be noted that the present invention can be implemented not only as an image recognition device like this, but also as a method including steps corresponding to unique units included in the image recognition device, as a program causing a computer to execute these steps, and a computer-readable recording medium such as a CD-ROM in which the program is stored.

Effects of the Invention

The present invention eliminates the necessity of preparing a database exclusive for image recognition required by conventional image recognition devices. Thus, the present invention eliminates the necessity of re-making or managing such database for recognition even in the case of a number of target objects to be recognized.

In contrast to the conventional image recognition devices, the present invention drastically reduces the possibility that a target image cannot be recognized due to lack of an image corresponding to the target image in such database, and increases the possibility that various kinds of images can be recognized.

Accordingly, the present invention does not require much labor for maintenance and learning by the device itself, does not limit the kinds of recognition targets, and increases the possibility of recognition of unknown images. Therefore, the present invention is highly practical because mobile information devices with a shooting function have been widely spread to date.

BRIEF DESCRIPTION OF DRAWINGS

FIG. 14 is a diagram showing a recording medium storing a program for implementing the image processing device according to the present invention.

NUMERICAL REFERENCES

Figure 1:
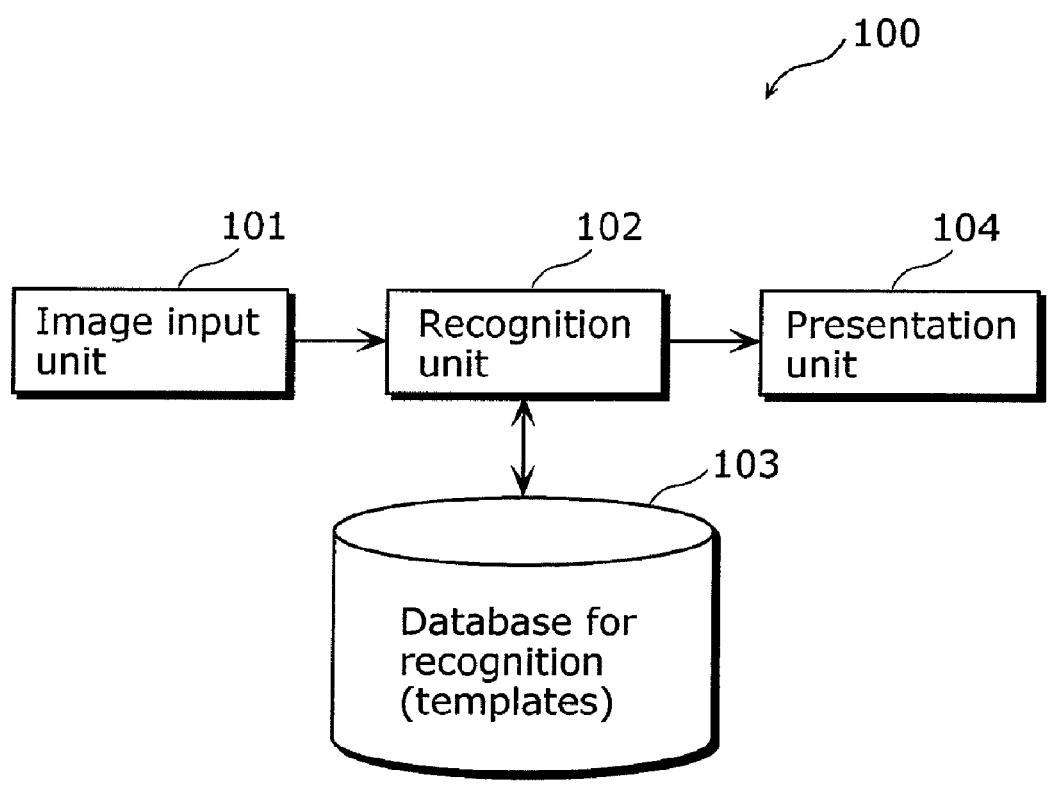
FIG. 1 is a functional block diagram showing the structure of a conventional image processing device.

200, 400, 500, 600 Image recognition device
201 Image input unit

202 Similar image search unit
203 Keyword extraction unit
204 Keyword analysis unit
205 Presentation unit
206 Server device
401 Image specification unit
501 Simple classification unit
502 Classification database
610 Pre-processing unit
620 Detailed information database

BEST MODE FOR CARRYING OUT THE INVENTION

An embodiment according to the present invention is described below in detail with reference to the drawings.

Figure 2:
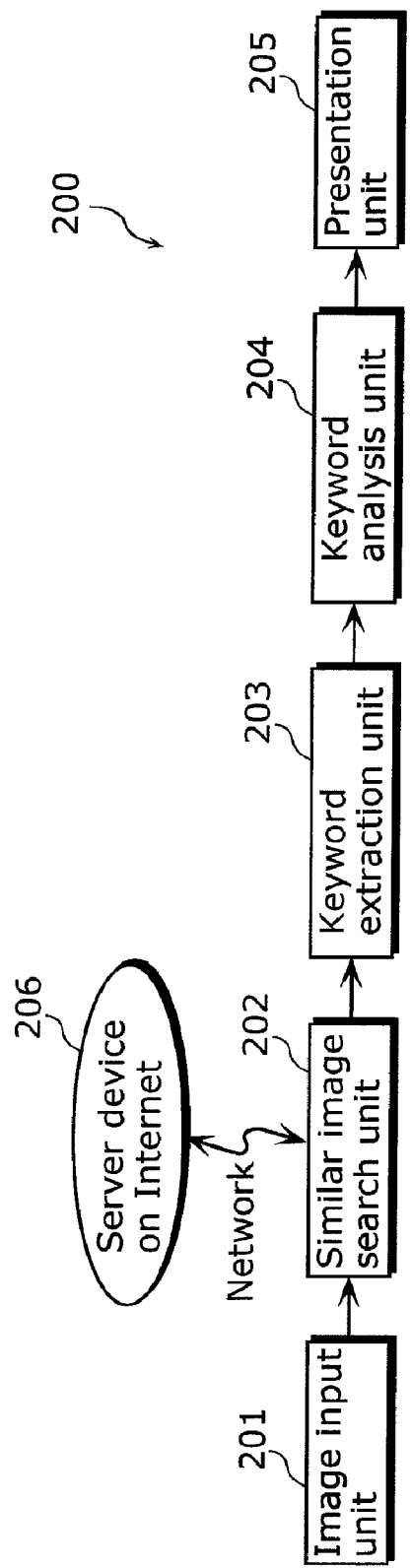
FIG. 2 is a functional block diagram showing the structure of an image processing device according to the present invention.

FIG. 2 is a functional block diagram showing the structure of an image recognition device according to the present invention. The image recognition device 200 is a device which outputs, as a recognition result, information indicating what an input image is. This image recognition device 200 includes an image input unit 201, a similar image search unit 202, a keyword extraction unit 203, a keyword analysis unit 204, and a presentation unit 205, and implemented by means of a personal computer and a program executed therein, or the like.

The image input unit 201 is a processing unit which obtains a target image to be recognized. For example, the image input unit 201 reads out an image file including a still image, a video, etc. shot by a digital camera or the like and stored therein from a local disc (not shown) in the device according to a specification from a user.

The similar image search unit 202 is a processing unit which searches out, as a similar image, at least one image similar to the target image obtained by the image input unit 201 from among images which have been generated independently of the image recognition device 200, present in a server device 206 accessible via the Internet, and unintentionally obtained. It is to be noted that the "unintentionally-obtained images" are images generated independently of the image recognition device 200 and include various kinds of images present and published in Web sites on the Internet. In addition, the "images generated independently of the image recognition device 200" include images generated without consideration of image recognition, and may include images generated with consideration of image recognition. In addition, the server device to be searched may be an arbitrary one, and the number of server device(s) may be one or more. The Web sites may be Web sites exclusive for images, or general Web sites.

More specifically, the similar image search unit 202 searches for, as a similar image, an image included in an Exif file, and searches for a similar image present in a server device 206 through Web pages. In the case where the similar image search unit 202 searches out, as similar images, images similar to the target image to be recognized, it calculates, for each of the similar images, the degree of similarity with the target image.

The keyword extraction unit 203 is a processing unit which extracts plural keywords which can be recognition result candidates of the target image to be recognized from among attached information of the similar images searched out by the similar image search unit 202. Here, the keywords are words, phrases, sentences and the like including proper names such as geographical names and celebrity names, general names, and the like.

For example, the keyword extraction unit 203 extracts a keyword from header information in the Exif file, extracts a keyword using, as a clue, tag information included in a Web page or an other Web page associated with the Web page, or extracts, as keywords, peripherally-positioned words and phrases included in the Web page or the other Web page associated with the Web pate using a link or the like. In some cases, the keyword extraction unit 203 extracts keywords which may be overlapped from plural similar images searched out by the similar image search unit 202.

The keyword analysis unit 204 is a processing unit which specifies at least one of the plural keywords which is likely to be a recognition result of the target image to be recognized by analyzing the plural keywords extracted by the keyword extraction unit 203.

For example, the keyword analysis unit 204 (i) analyzes, for each of the plural keywords extracted by the keyword extraction unit 203, the number of each keyword (that is, the appearance frequency of each keyword) and specifies, as a recognition result, at least one of the keywords which is a majority among the plurality of keywords, (ii) associates each of keyword-attached images with the degree of similarity calculated, for the attached image, by the similar image search unit 202, and specifies the keyword having a high degree of similarity as the recognition result, and (iii) specifies, as the recognition result, at least one keyword which is a majority among the plurality of keywords and having a high degree of similarity. It is to be noted that the algorithms of these recognition results can be previously selected (set) by the user.

The presentation unit 205 is a processing unit, a display or the like which outputs a keyword specified by the keyword analysis unit 204 as a recognition result of the target image to be recognized. Here, in the case where the keyword analysis unit 204 specifies, as recognition results, plural keywords each of which is a majority among the plurality of keywords or has a high degree of similarity, the presentation unit 205 displays and outputs the plural keywords specified by the keyword analysis unit 204 by, for example, sorting them in a descending order of the numbers of the respective keywords or the magnitude of the degrees of similarity of the same.

Next, a description is given of operations of the image recognition device 200 according to this Embodiment configured as described above.

Figure 3:
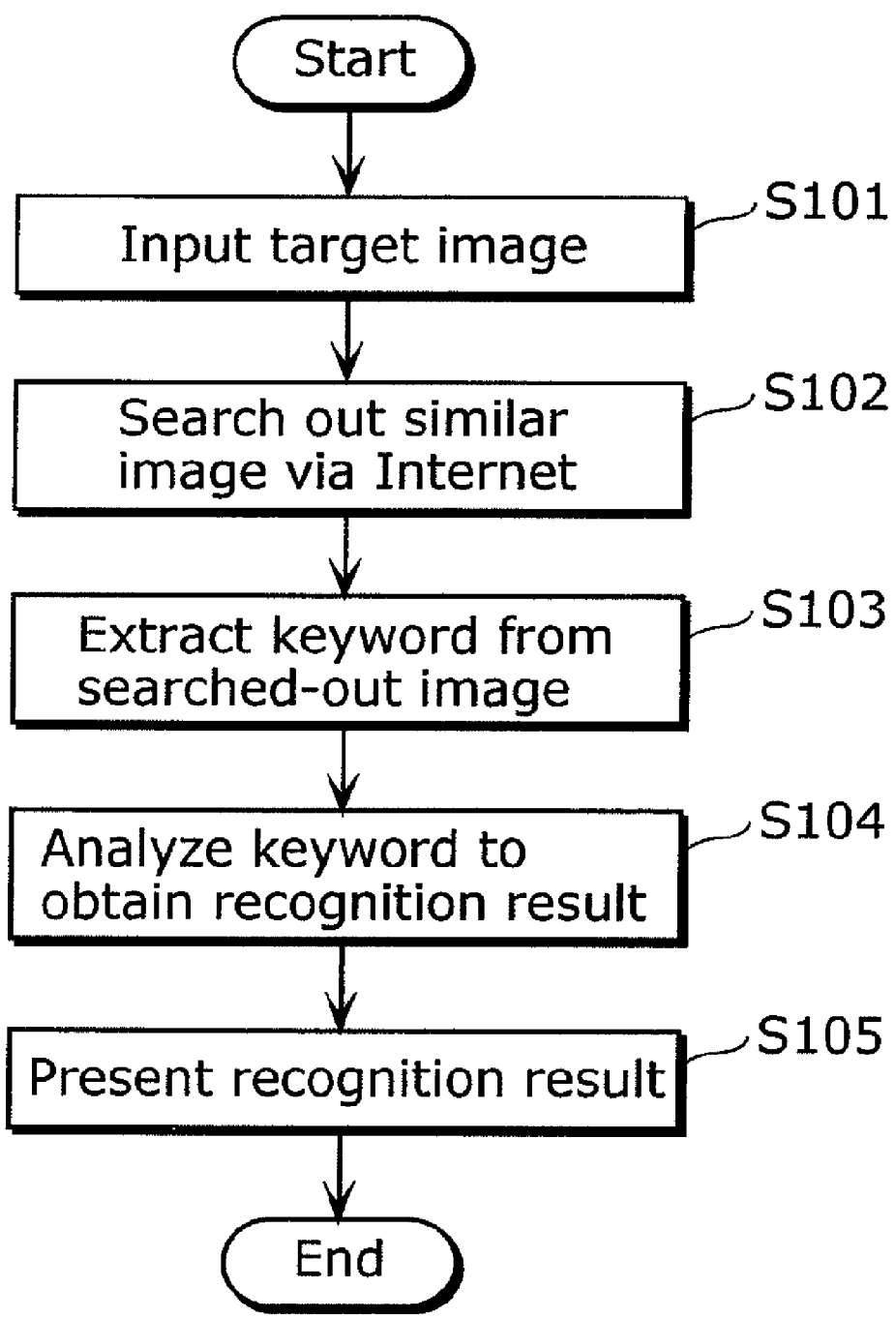
FIG. 3 is a flowchart indicating operations of the image processing device according to the present invention.
Figure 4:
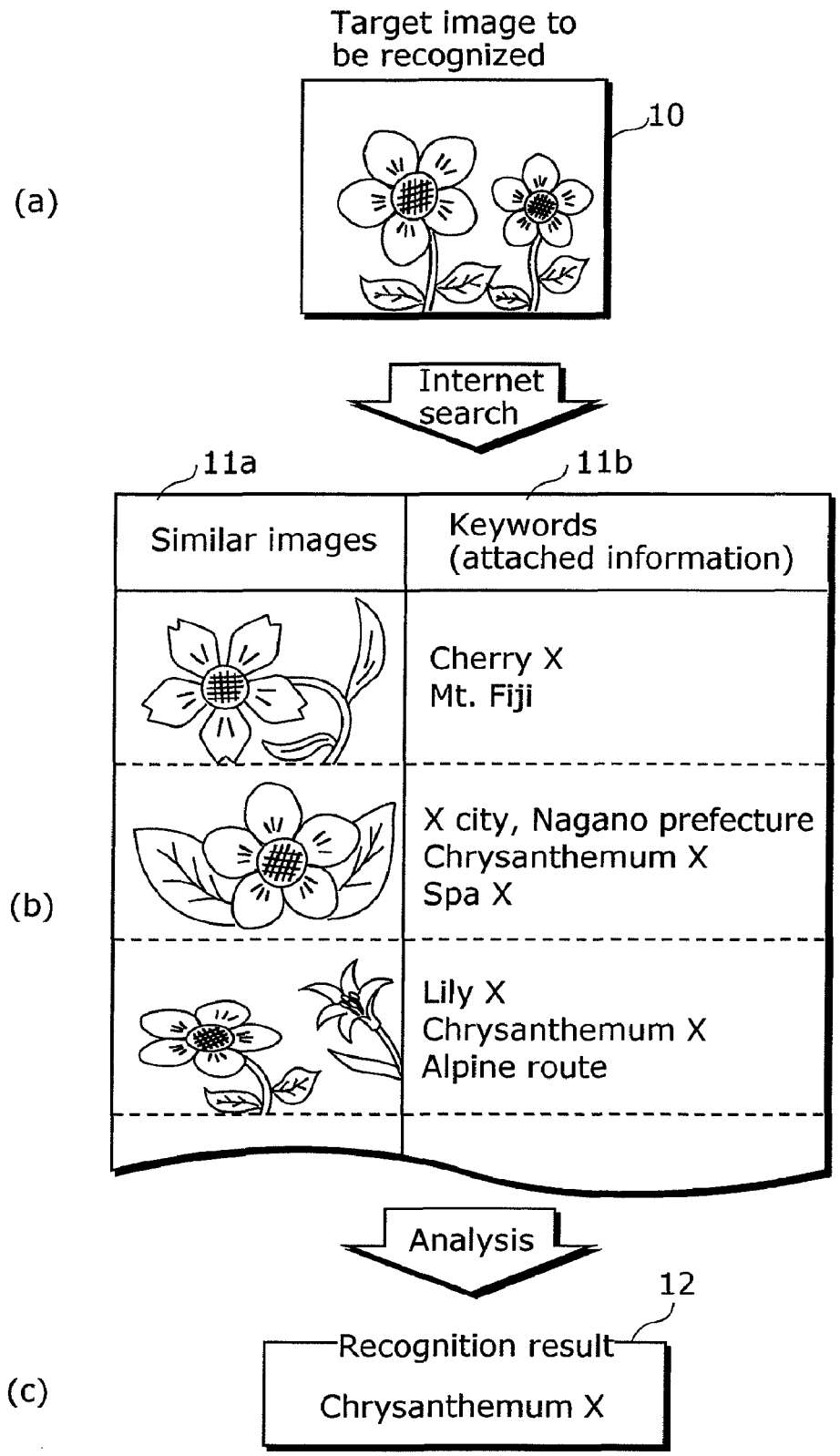
FIG. 4 is a flowchart indicating operations of the image processing device according to the present invention.

FIG. 3 is a flowchart indicating the procedure of the operations performed by the image recognition device 200 according to this Embodiment. FIG. 4 is a diagram for illustrating the operations of the image recognition device 200.

First, the image input unit 201 obtains a target image to be recognized such as an image 10 shown in FIG. 4(a) (S101). Here, the image input unit 201 may be an imaging device such as a camera, and may be a recording medium in which the target image to be recognized has been pre-stored. In the case where the image input unit 201 is an imaging device, the image input unit 201 shoots an image of a target object to be recognized on site, and captures the target object as a target image to be recognized. In addition, in the case where the image input unit 201 is a recording medium, the image input unit 201 obtains the target image to be recognized by means that the user specifies an image file from among the images recorded previously. The target image obtained by the image input unit 201 is outputted to the similar image search unit 202.

Subsequently, the similar image search unit 202 obtains the similar image, such as a similar image 11a shown in FIG. 4(b), which is similar to the target image to be recognized from the server device 206 on the Internet (S102).

Figure 5:
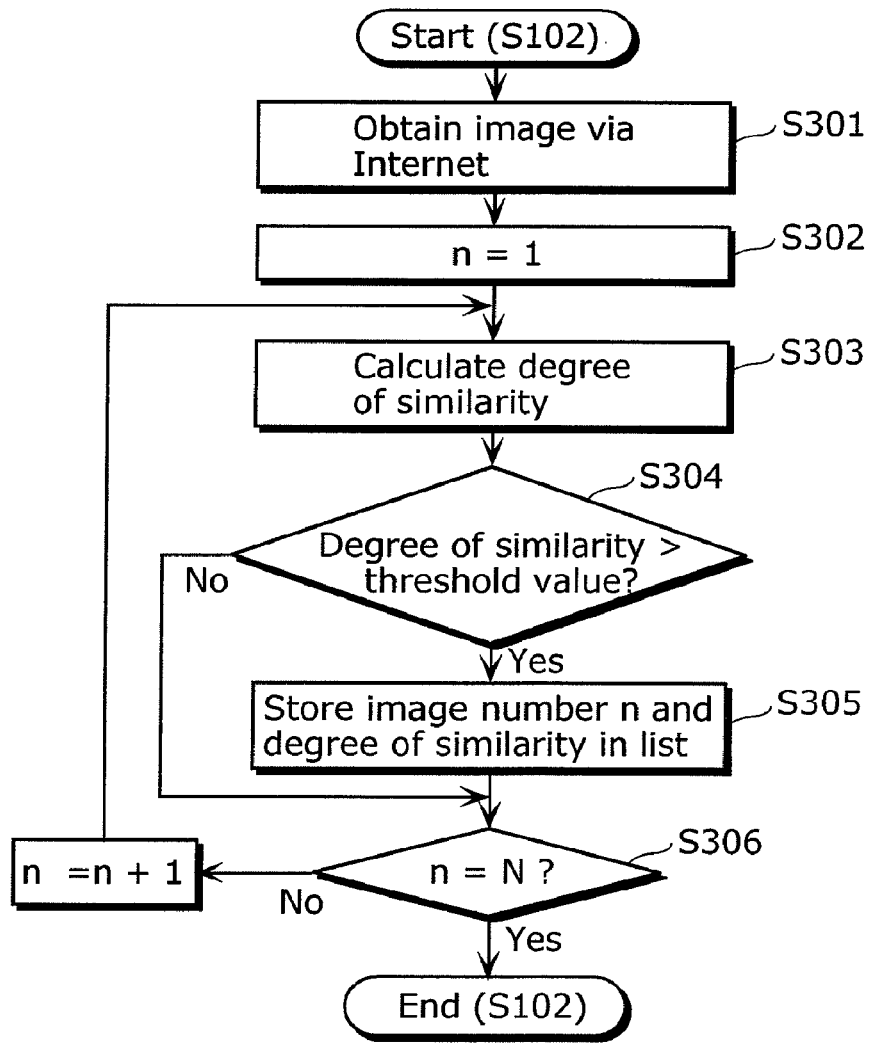
FIG. 5 is a flowchart indicating the details of Step S102 of FIG. 3.

FIG. 5 is a flowchart indicating the details of Step S102. The similar image search unit 202 obtains (that is, downloads) an image from the server device 206 on the Internet (S301). The server device 206 is a host server of sites which shares the image, a general Web server, or the like. Here, a description is given below assuming that the number of obtained download images is N (indicating 1 or more) and the respective download images are assigned with numbers 1 to N.

The similar image search unit 202 sets the value n, which indicates an image number, of a counter to "1" so that N download images are processed sequentially in order (S302). It is to be noted that N may be a predetermined fixed value, or a variable value which is firstly set as an initial value and is subsequently incremented reflecting a result of judgment on the degree of similarity with respect to a threshold value described later (for example, the variable value may be a value which yields a predetermined total number of similar images each having a degree of similarity exceeding the threshold value).

On the N download images, the processing of Steps S303 to S305 are performed in order. First, the similar image search unit 202 calculates the degree of similarity between the download image assigned with a number n and the target image to be recognized (S303). What is used as an example for the degree of similarity is a distance between the images in template matching. It is assumed here that the degrees of similarity become higher as pairs of images become more similar to each other. For example, plural kinds of feature quantities are calculated for these two images and the distances between vectors indicating the plural kinds of feature quantities are assumed to be the degrees of similarity. Here, the plural kinds of feature quantities include coordinate information, luminance information, color information, edge information, and spatial frequency information.

In addition, in the case of calculating the degree of similarity between the target image to be recognized and each download image, it is also good to segment each of the target image to be recognized and the download image into sub-images and then calculate the degrees of similarity between the sub-images of the target image and the sub-images of the download image. When such segmentation is performed, it is only necessary to regard, as the degree of similarity between the target image and the download image, the maximum one of the degrees of similarity obtained from the respective combinations of the sub-images associated with each other. In addition, the similar images may be stored or discarded after the calculation of the degrees of similarity.

Subsequently, the similar image search unit 202 compares the degree of similarity with the predetermined threshold (S304). When the results shows that the degree of similarity is greater than the threshold value (Yes in S304), the similar image search unit 202 stores, in a list, a pair of an image number n and the degree of similarity (S305). In contrast, when the degree of similarity is equal to or smaller than the predetermined threshold value (No in S304), the processing of Step S305 is skipped and a transition to Step S306 is made.

In Step 306, the similar image search unit 202 determines whether or not the image number n is equal to the total number N of download images, that is, all the download images have already been processed. When the result shows that n is not equal to N (No in S306), the similar image search unit 202 increments n by 1 (S307) and then re-calculates the degree of similarity (S303). In contrast, when n is equal to N (Yes in S306), the similar image search unit 202 terminates the processing. The processing performed by the similar image search unit 202 as described above enables obtainment of a list including information indicating the pair of (i) the image number of a download image having a degree of similarity not less than the predetermined threshold with the target image to be recognized and (ii) the degree of similarity.

Subsequently, with reference to FIG. 2 again, the keyword extraction unit 203 obtains attached keywords attached to the respective download images each having an image number indicated in the list obtained by the similar image search unit 202 (S103). Attached keywords are, for example, keywords 11b shown in FIG. 4(b). The keyword extraction unit 203 may obtain keywords from tag described as Exif information directly on the download images, may obtain keywords as tag assigned to the images when the download images are images obtained from image sharing sites, and may obtain keywords from language found in the periphery of the position, in a Web page, at which the download image is described. In addition, it is also possible to obtain words and phrases described at the position at which the download image is described and described at the periphery of the position by analyzing the source code of the Web page described using html language or the like. The keywords obtained in this way from the respective download images are outputted to the keyword analysis unit 204.

Here, the keyword extraction may be performed on all the images described in the list, or may be performed on images selected from among those listed when a number of images are described in the list. In addition, the user can select (or previously set) one or plural keyword extraction methods (for extracting keywords using headers of Exif files, tags in Web pages, or the like).

Subsequently, the keyword analysis unit 204 analyzes the frequency (the appearance frequency, that is, the number of each input keyword) of each input keyword (S104). Subsequently, the keyword analysis unit 204 outputs the keyword selected based on the frequency as a recognition result of the target image to be recognized. Here, methods for selecting a keyword based on the frequency include a method for selecting the keyword having the greatest frequency. In addition, the number of keywords to be selected is not limited to one, and plural keywords may be selected.

Figure 6:
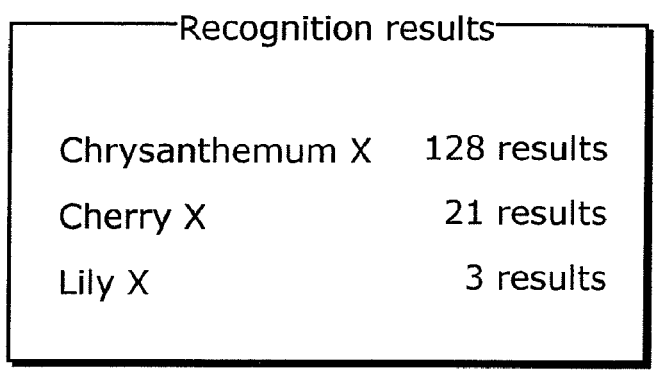
FIG. 6 is a diagram showing an exemplary output by the image processing device according to the present invention.

Lastly, the presentation unit 205 presents, to the user, the recognition result obtained by the keyword analysis unit 204, as shown in a display example 12 of FIG. 4(c) (S105). Presentation methods include a method for displaying the recognition result on a display screen as letter information, and a method for reading out the recognition results with a synthesized voice to output them from speakers. In addition, as shown in FIG. 6, the presentation unit 205 may display a predetermined number of keywords from among the keywords extracted by the keyword extraction unit 203 by sorting them in a descending order of frequencies calculated by the keyword analysis unit 204.

As described above, the image recognition device 200 in this Embodiment selects similar images similar to a target image to be recognized from among images generated independently of the image recognition device 200 and unintentionally obtained, analyzes the frequencies of the respective keywords attached to the images, and selects at least one keyword as a recognition result. Here, images of various objects are present on the Internet. Thus, it is very unlikely that the image recognition device 200 like this cannot recognize a target image to be recognized due to lack of images corresponding to the target image to be recognized in an exclusive database for recognition as in conventional image recognition methods. In addition, the image recognition device according to the present invention makes it possible to recognize a wide variety of objects without making a unique (exclusive) database.

Figure 7:
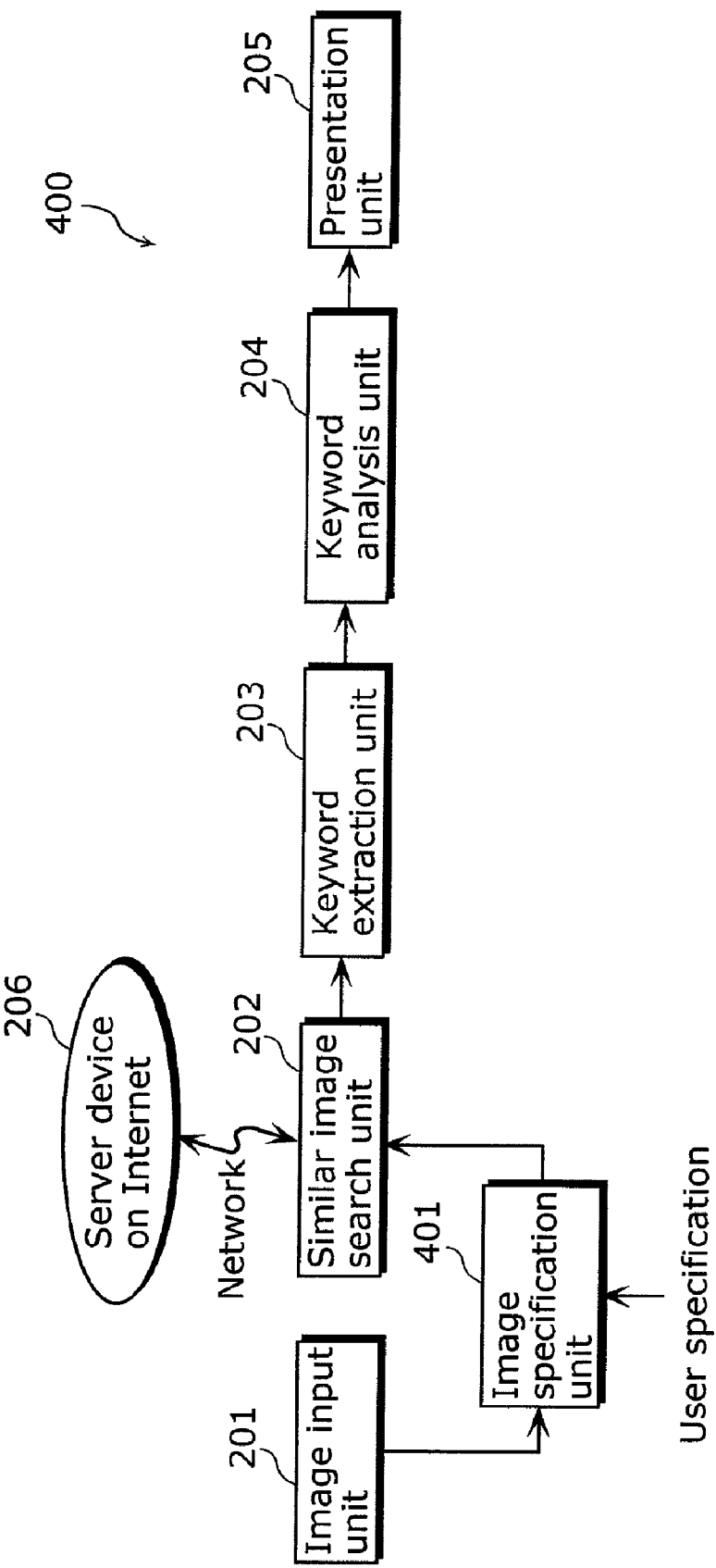
FIG. 7 is a functional block diagram showing the structure of the image processing device according to Variation 1.

In the above-described Embodiment, the whole target image to be recognized is subjected to image recognition, but it is to be noted that a part of the target image may be subjected to image recognition. FIG. 7 is a functional block diagram showing the structure of an image recognition device 400 according to Variation 1 of the Embodiment. As shown in the diagram, the image recognition device 400 according to Variation 1 has the structure including the structure of the image recognition device 200 in the Embodiment as shown in FIG. 2 and an additional element of an image specification unit 401. The structural elements other than the image specification unit 401 and the processing details thereof are substantially equivalent to those in the Embodiment.

Figure 8:
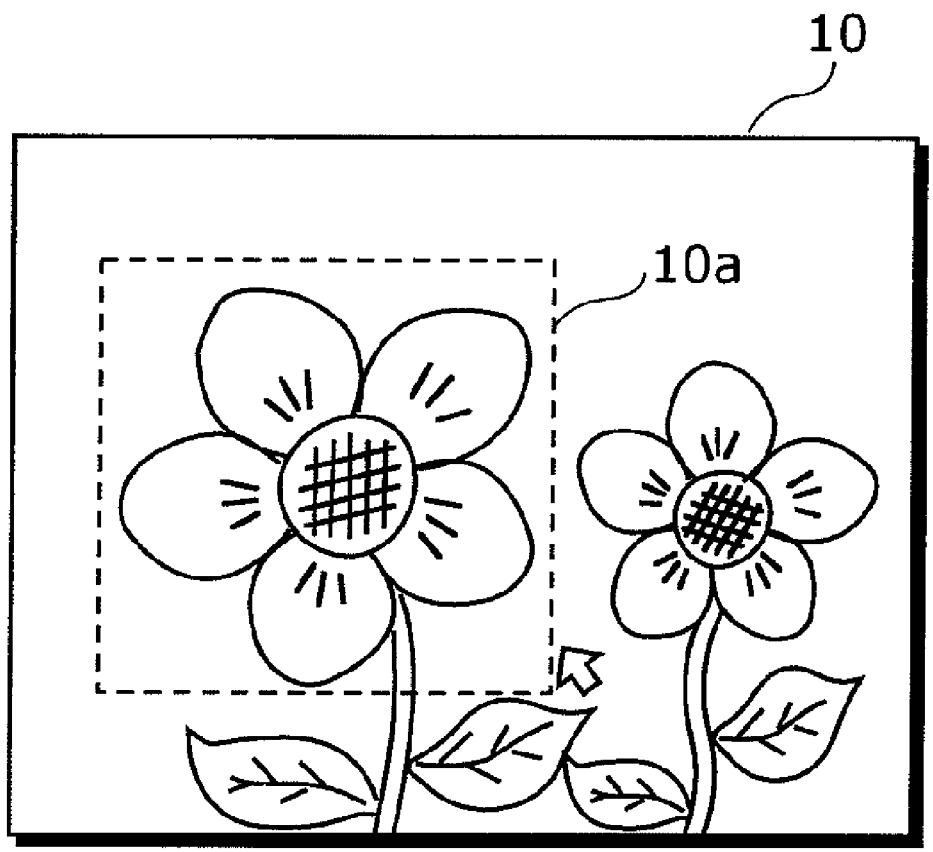
FIG. 8 is a diagram for illustrating operations of the image processing device according to Variation 1.

The image specification unit 401 receives an input of an image of a target object to be recognized from the image input image 201. The image specification unit 401 specifies, in an image 10 inputted from the image input unit 201 in FIG. 8, an area which is enclosed by the doted lines 10a in the image 10 as including the target object. Area identification at this time is performed by, for example, a user's direction. Subsequently, the image specification unit 401 outputs the image in the specified area to the similar image search unit 202. It is to be noted that the image specification unit 401 may output the image in the area specified by the user directly to the similar image search unit 202, or may detect the boundaries of the image within the area specified by the user and output only the image enclosed by the detected boundaries to the similar image search unit 202.

As described above, the image recognition device 400 according to Variation 1 searches out similar sub-images similar to the user-selected area within the target image from among the images on the Internet, analyzes the frequencies of the keywords attached to the searched-out sub-images, and selects at least one keyword as the recognition result. This produces an advantageous effect of narrowing down to objects included in the user-specified area within the input image to perform image recognition, in addition to the advantageous effect obtainable in the above-described Embodiment.

Figure 9:
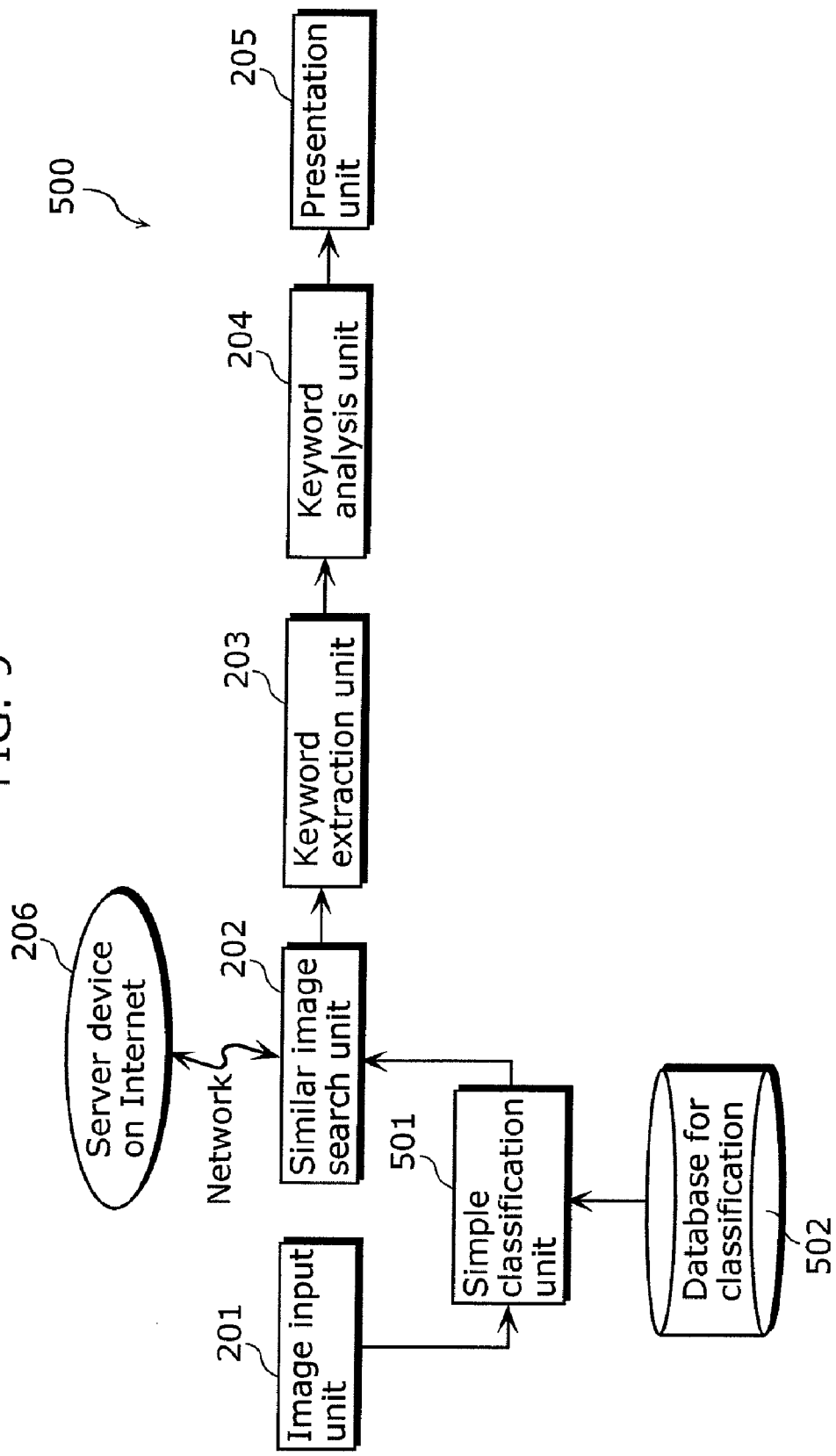
FIG. 9 is a functional block diagram showing the structure of the image processing device according to Variation 2.

In addition, although similar images are searched for using, as a clue, only the target image to be recognized in the Embodiment, similar images may be searched for further using, as a clue, category information of the target image, in addition to the target image itself. FIG. 9 is a functional block diagram showing the structure of an image recognition device 500 according to Variation 2 of the Embodiment. As shown in the diagram, the image recognition device 500 according to Variation 2 has the structure including the structure of the image recognition device 200 in the Embodiment as shown in FIG. 2 and additional elements of a simple classification unit 501 and a classification database 502. The structural elements other than the simple classification unit 501 and the classification database 502 and the processing details thereof are substantially equivalent to those in the above-described Embodiment.

Figure 10:
FIG. 10 is a diagram indicating exemplary data in a classification database included in the image processing device according to Variation 2.

Into the simple classification unit 501, the target to be recognized is inputted from the image input unit 201. The simple classification unit 501 performs a simple classification on the target image before the similar image search unit 202 downloads images on the Internet. For example, the target image is simply classified by preparing a local classification database 502 in the simple classification unit 501 and referring to templates included in the classification database 502 as in conventional image recognition methods. For example, the classification database 502 is a table including registrations of associations between "image features (such as spatial frequency components, outline shapes, statistical feature quantities, and color distributions)" and a "category" as shown in FIG. 10. The simple classification unit 501 analyzes spatial frequency components etc. of the target image to be recognized, searches the classification database 502 for the "image features" which match the analysis results, and obtains the associated "category" as simple classification results. Subsequently, the simple classification unit 501 outputs the simple classification results in addition to the target image itself to the similar image search unit 202.

The similar image search unit 202 obtains (downloads) images from a server on the Internet based on the simple classification results inputted by the simple classification unit 501. For example, the similar image search unit 202 downloads, as similar images, either (i) images obtained by first search performed using the simple classification results as keywords or (ii) images obtained by second search using the similar images obtained by the first search performed using the simple classification results as keywords.

As described above, the image recognition device 500 according to Variation 2 searches out similar images from among the images on the Internet using the simple classification results of the target image to be recognized as the keywords, analyzes the frequencies of the respective keywords attached to the images, and selects at least one keyword as the recognition result. Performing such simple classification in advance in this way produces advantageous effects such as reduction in the number of images to be downloaded through the Internet, saving of the download time, reduction in the processing amount, reduction in the memory capacity to hold the download images, in addition to the advantageous effect obtainable by the above-described Embodiment.

In addition, keywords each having a high frequency are judged to be recognition results from among the keywords extracted by the keyword extraction unit 203 in the above-described Embodiment, but it is to be noted that the degrees of similarity between the target image to be recognized and the respective similar images may be used as weights in the calculation of the frequencies. Each of FIGS. 11(a) to 11(c) is a diagram illustrating operations of an image recognition device according to Variation 3 which determines recognition results with consideration of such weights based on the degrees of similarity between the target image to be recognized and the respective similar images. The structure of the image recognition device according to Variation 3 is basically similar to that of the image recognition device 200 in the above-described Embodiment shown in FIG. 2. A description is given of the structural elements each having a function different from those in the Embodiment.

As shown in FIG. 11(a), the similar image search unit 202 in the image recognition device according to Variation 3 calculates the degrees of similarity between the target image to be recognized and the respective similar images in advance when each similar image is searched out. Subsequently, the keyword analysis unit 204 stores the degree of similarity of each similar image in association with the extracted keyword each time the keyword extraction unit 203 extracts a keyword for each similar image. In the example of storage shown in FIG. 11(a), the respective keywords A, B, C, and D attached to a similar image I1 having a degree of similarity S1 are associated with the degree of similarity 51, the respective keywords B, D, and E attached to a similar image 12 having a degree of similarity S2 are associated with the degree of similarity S2, . . . , and the respective keywords F and H attached to a similar image In having a degree of similarity Sn are associated with the degree of similarity Sn.

Figure 11:
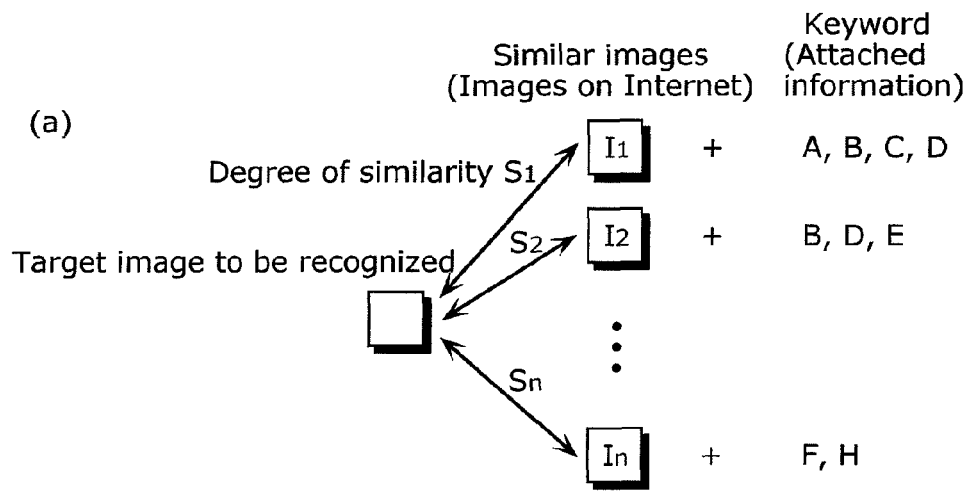
FIG. 11 is a diagram illustrating a method for recognizing a target image to be recognized by weighting based on the degree of similarity between the target image and each of the similar images.

Subsequently, as shown in FIG. 11(b), the keyword analysis unit 204 calculates a sum of weights ωn for each keyword which has been extracted by the keyword extraction unit 203 and has a weight based on the degree of similarity by calculating a total $\Sigma\omega i$ of the weight f (Si) obtainable by substituting an associated sum of weights $\omega i$ or the degree of similarity into a predetermined function (for example, a function f for calculating a weight normalized with the total sum of the degrees of similarity). Lastly, as shown in FIG. 11(*c*), the presentation unit 205 displays the keywords as the recognition results in a descending order of the sums of weights $\omega n$ together with the degrees of certainty (obtainable by normalizing the values to values within the range of 0 to 1).

As described above, the image recognition device according to Variation 3 determines, as recognition results, keywords having high frequencies and obtained considering not only the frequencies of the respective extracted keywords but also weights based on the degrees of similarity between the target image to be recognized and the respective similar images, and thus can perform image recognition with an accuracy higher than the accuracy achievable according to an approach of determination based on the frequencies only.

In the case where a number of keywords is attached to some similar images, weights to the respective keywords may be decreased when considering the weights based on such degrees of similarity. In addition, it is also good to increase the weighs to keywords, such as keywords included in header information of Exif files, directly attached to the similar images, and to increase the weights to keywords present at the peripheries of the similar images in a Web page or the like as the distances (for example, the distance on a display screen) from the similar images become closer. The image recognition accuracy is further increased by reflecting various relationships between each similar image and its keywords on the weights when obtaining recognition results.

In the above-described Embodiment and its Variations, similar images are searched out using, as a clue, only the target image to be recognized, or using, as a clue, the target image to be recognized and information (classification information) obtainable from the target image. However, in the case where attached information is attached to the target image, it is also good to search out similar images using, as keywords, the attached information or information relating to the attached information.

Figure 12:
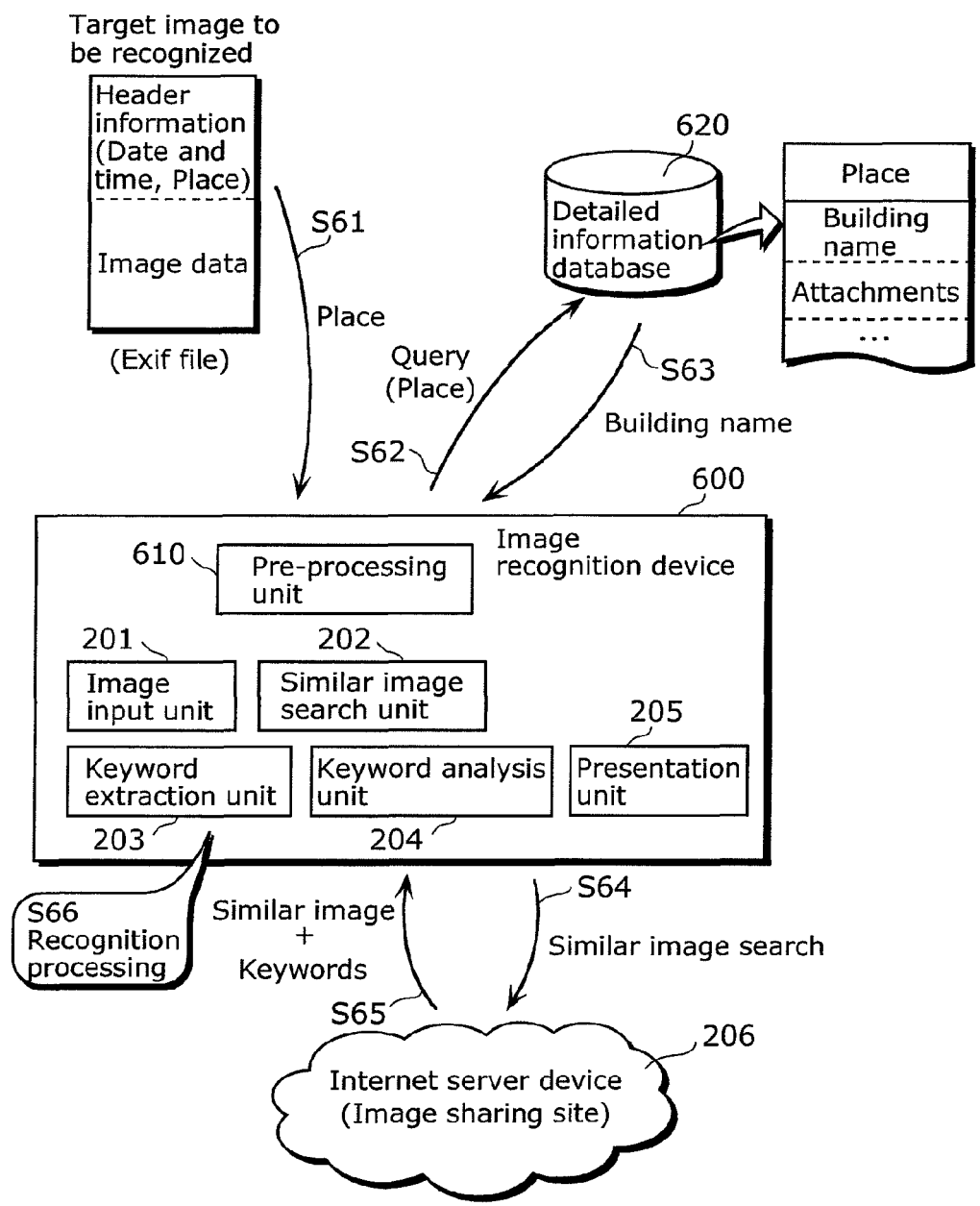
FIG. 12 is a diagram indicating the structure of and operations performed by the image processing device which searches out a similar image using, as a keyword, detailed information relating to attached information attached to the target image.

FIG. 12 is a functional block diagram showing the structure of an image recognition device 500 according to Variation 4 which searches out similar images using, as keywords, detailed information relating to attached information attached to a target image to be recognized. As shown in the diagram, the image recognition device 600 according to this Variation has the structure of the image recognition device 200 in the above-described Embodiment shown in FIG. 2 and additional structural elements of a pre-processing unit 610 and a detailed information database 620.

The detailed information database 620 is a database for storing attached information of images possible as the target image to be recognized and detailed information of the attached information in an associated manner. For example, the detailed information database 620 is a database for buildings which stores, as such attached information, information indicating geographical locations (such as latitudes and longitudes) and information (indicating, for example, building names and the kinds of facilities) identifying landmarks near the respective geographical locations.

The pre-processing unit 610 is a processing unit which obtains attached information attached to the target image obtained by the image input unit 201, verifies the obtained attached information with the attached information registered in the detailed information database 620, and obtains detailed information corresponding to the attached information attached to the target image obtained by the image input unit 201.

Operations of the image recognition device 600 according to Variation 4 configured like this are described in Steps S61 to 66 of FIG. 12. First, the pre-processing unit 610 obtains attached information attached to the target image to be recognized (S61). In the case where the target image is a shot image and stored in an Exif file, the pre-processing unit 610 obtains information (the latitude and longitude, etc.) indicating the shot place (geographical location) from the header information of the Exif file. Subsequently, the pre-processing unit 610 verifies the obtained attached information with the attached information registered in the detailed information database 620 (S62), and obtains the detailed information corresponding to the attached information (S63). For example, searching the detailed information database 620 for a similar image using, as the keyword, the shot place which is attached to the target image enables obtainment of the name of a building at or near the shot place.

Subsequently, the similar image search unit 202 searches the server device 206 on the Internet for a similar image using, as a keyword, the detailed information obtained by the pre-processing unit 610 (S64), thereby obtaining a similar image which is similar to the target image and relates to the detailed information and the keyword attached thereto. For example, the similar image search unit 202 searches out images through WWW using the building name as a keyword, and obtains, as similar images, images similar to the target image from among these searched-out images and obtains the keywords attached thereto.

Subsequently, as in the Embodiment, the keyword analysis unit 204 analyzes the frequency of each of the obtained keywords, and selects at least one keyword having a high frequency as the recognition result (S66). At this time, selection as recognition results may be made by increasing the weights of the keywords which are the same as or similar to the detailed information obtained from the detailed information database 620. Lastly, the presentation unit 205 presents the selected recognition results to the user.

As described above, since the image recognition device 600 according to Variation 4 searches out similar images using the attached information of the target image to be recognized, the image recognition device 600 is capable of searching out similar images each having a higher degree of similarity, and saving the time to search out the similar images, compared to the case of searching for similar images based on the target image only. Therefore, with the image recognition device 600, it is possible to increase the image recognition accuracy and the processing speed.

Exemplary operations of the image recognition device 600 according to Variation 4 may include obtaining and using attached information relating to seasons, time zones, etc. in addition to obtaining, from the detailed information database 620, the name of a building or a famous spot included in the shot image using the shot place as a clue. In the case where an image object is a plant or an insect, the season and places in and at which the image object exists are limited, and thus the season and places may be utilized as knowledge for image recognition. For example, it is assumed that likely keywords are selected from among plural keywords using the Bayes Estimation. Here, when a shooting date and time is attached to the target image to be recognized, each of the plants and insects which appear in the season and time zone to which the shooting date and time belongs is pre-assigned with a high priori probability in the Bayes Estimation. Subsequently, the keyword having the maximum priori probability in the Bayes Estimation is selected as the recognition result from among the plural keywords. The recognition accuracy can be increased using the attached information attached to the target image to be recognized when searching for similar images but also using the attached information as the knowledge (supplemental information in recognition processing) for recognition in this way.

In addition, the presentation unit 205 displays only the recognition result in the above-described Embodiment, but it is also good to display the recognition result by superimposing the recognition result on the target image. At this time, the presentation unit 205 synthesizes the target image to be recognized and a sequence of letters indicating the recognition result using a computer graphics (CG) technique or the like such that the sequence of letters indicating the recognition result is placed around a target object to be recognized within the target image.

Figure 13:
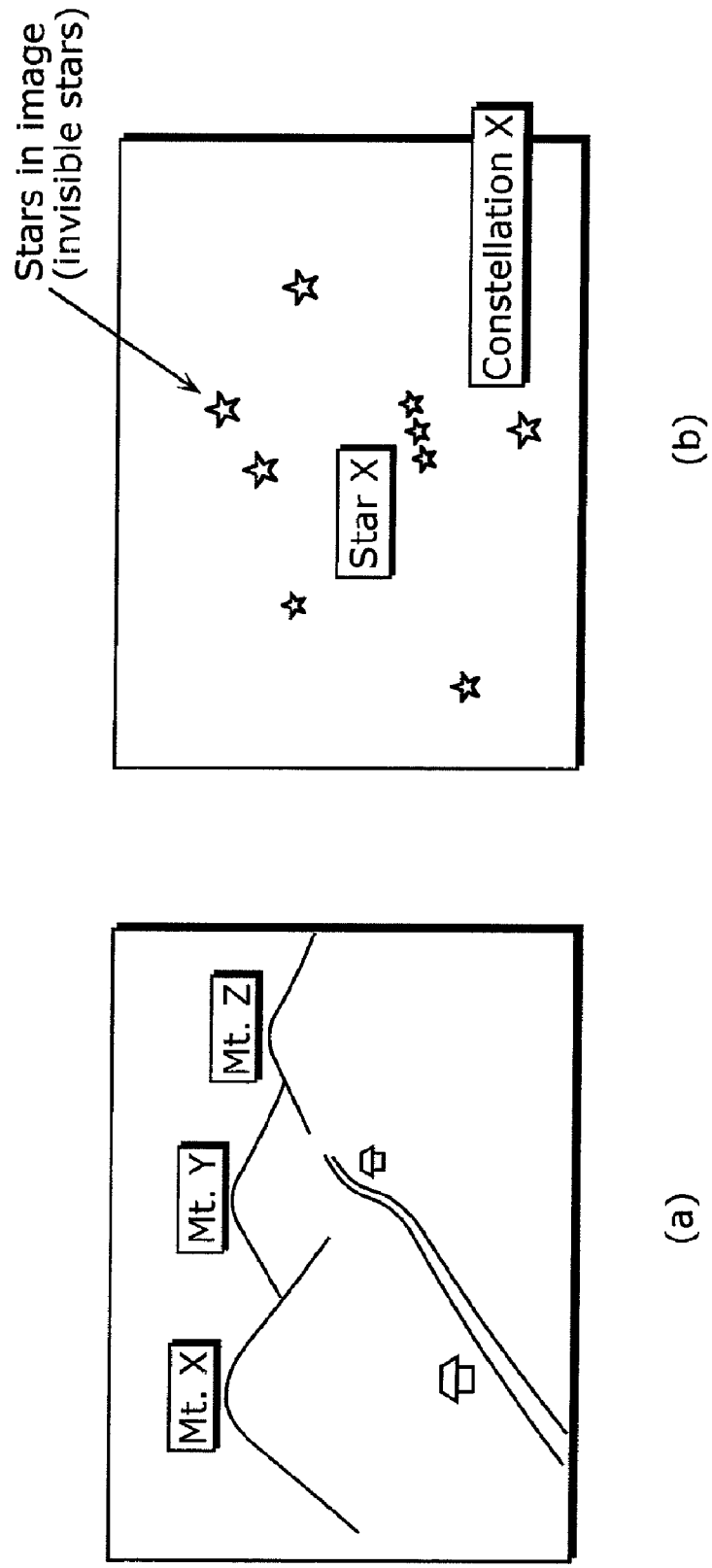
FIG. 13 is a diagram showing an example of superimposing recognition results on the target image.

As an example, as shown in FIG. 13(a), in the case where the name of a mountain is obtained as a recognition result, the name of the mountain is displayed in a synthesized image generated such that the name is placed near the mountain in the target image. As another example, as shown in FIG. 13(b), in the case where the name of a constellation or a star is obtained as a recognition result, the name is displayed in a synthesized image generated such that the name is placed near the constellation or star in the target image. In this way, the target image and the recognition result are associated with each other on the target image, and thus the user can easily identify an unknown recognition result. In addition, a landscape labeling is automatically performed based on the shot image, and thus travel information is automatically obtained for an unknown landscape at a travel site. As shown in FIG. 13(b), it is also good to display a synthesized image obtained by synthesizing the target image to be recognized and a star found to be there based on the image recognition result using a CG technique or the like although the star cannot be found in the target image (the star is invisible, but has been found to be there based on the positional relationships between constellations).

In addition, supplemental keywords used when searching for similar images and supplemental keywords used when analyzing (recognizing) the keywords are automatically generated by referring to the database in the above-described Embodiment and its Variations, but the user may specify such supplemental keywords. For example, the user may specify a category (which may be "flower", "tree", "insect", or the like) of the target image to be recognized. By doing so, the user can obtain further detailed information (that is, the recognition result) of the target image to be recognized using the information inputted by himself or herself as a clue.

Here is an example where the user knows that the image object of the image shot by the user himself or herself is a flower, but does not know the name of the flower. The user can use the image recognition device as a plant dictionary by causing the image recognition device to use "flower" as a supplemental keyword when searching for similar images or as a weight when analyzing (recognizing) the keyword, and thereby obtaining the name of the "flower" as the recognition result.

It is to be noted that the structural elements of the above-described Embodiment and its Variations may be arbitrarily combined to implement an image recognition device as another Embodiment. For example, it is also possible to combine Variation 1 and Variation 2 to cause the image specification unit 401 to specify a recognition target area, cause the simple classification unit 501 to perform classification of the image in the specified area, and cause the similar image search unit 202 to search out similar images.

In addition, it is also good to implement the image recognition device in each of the respective Embodiment and its Variations as a program which is executed by a computer. Furthermore, recording the program on a recording medium such as a flexible disc allows an independent computer system to easily execute the processing indicated in the respective Embodiment and Variations.

FIG. 14(a) to (c) is an illustration of a storage medium for storing a program for implementing the image recognition device, according to the above-mentioned embodiment, configured in a computer system.

FIG. 14(a) shows an example of a physical format of a flexible disc which is a recording medium body. FIG. 14(b) shows a flexible disc, and the front view and the cross-sectional view of the appearance of the flexible disc. A flexible disc FD is contained in a case F, a plurality of tracks Tr are formed concentrically on the surface of the disc from the periphery into the inner radius of the disc, and each track is divided into 16 sectors Se in the angular direction. Therefore, in the case of the flexible disc storing the above-mentioned program, the program is recorded in an area allocated for it on the flexible disc (FD).

In addition, FIG. 14(c) shows the structure for recording and reproducing the program on the flexible disc FD. When the program for implementing an image recognition method is recorded on the flexible disc FD, the computer system Cs writes the program via a flexible disc drive. In addition, when the image recognition device which performs the image recognition method mentioned above is configured in the computer system by the program recorded on the flexible disc, the program is read out from the flexible disc through the flexible disc drive and transferred to the computer system.

It is to be noted that the above description is given assuming that the recording medium is a flexible disc, but an optical disc can be used instead. In addition, the recording medium is not limited to flexible discs, and recording media such as IC cards and ROM cassettes and the like can also be used for the implementation.

Figure 15:
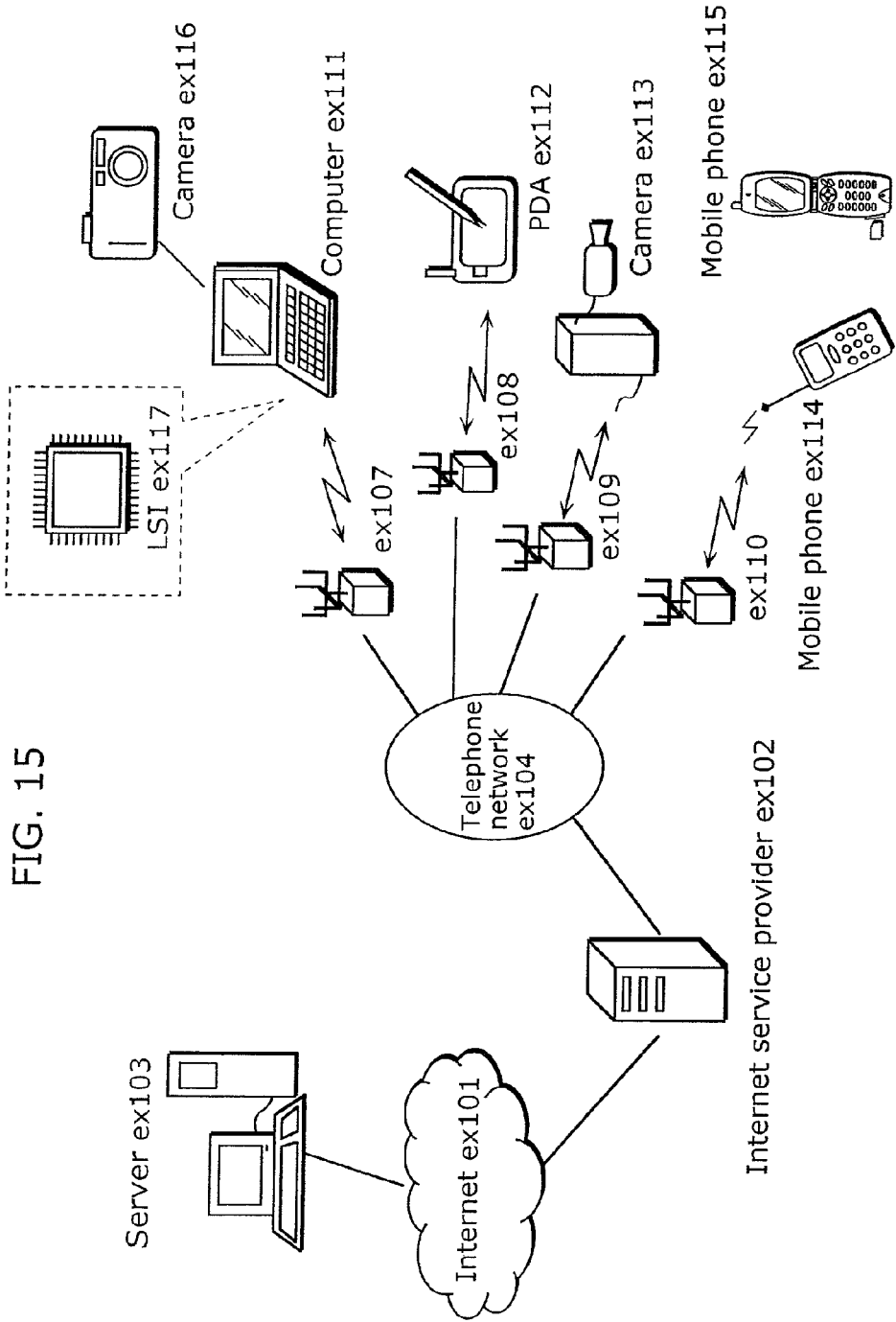
FIG. 15 is a diagram indicating examples of various electric devices each mounting the image processing device according to the present invention.

In addition, the image recognition device according to the present invention can be implemented not only in the computer, but also as a functional unit embedded in each of various kinds of electric devices ex111 to ex116 as shown in FIG. 15. At this time, the image recognition device is stored as a program in the storage media (such as a CD-ROM, a flexible disc, and a hard disc) attached to the various kinds of electric devices ex111 to ex116, or is implemented as an LSI ex117.

The various kinds of electric devices ex111 to ex116 are capable of searching out similar images from many servers ex103 on the Internet ex101 through a base stations ex107 to ex110, telephone networks ex104, and internet service providers ex102, and recognizing the searched-out images.

Figure 16:
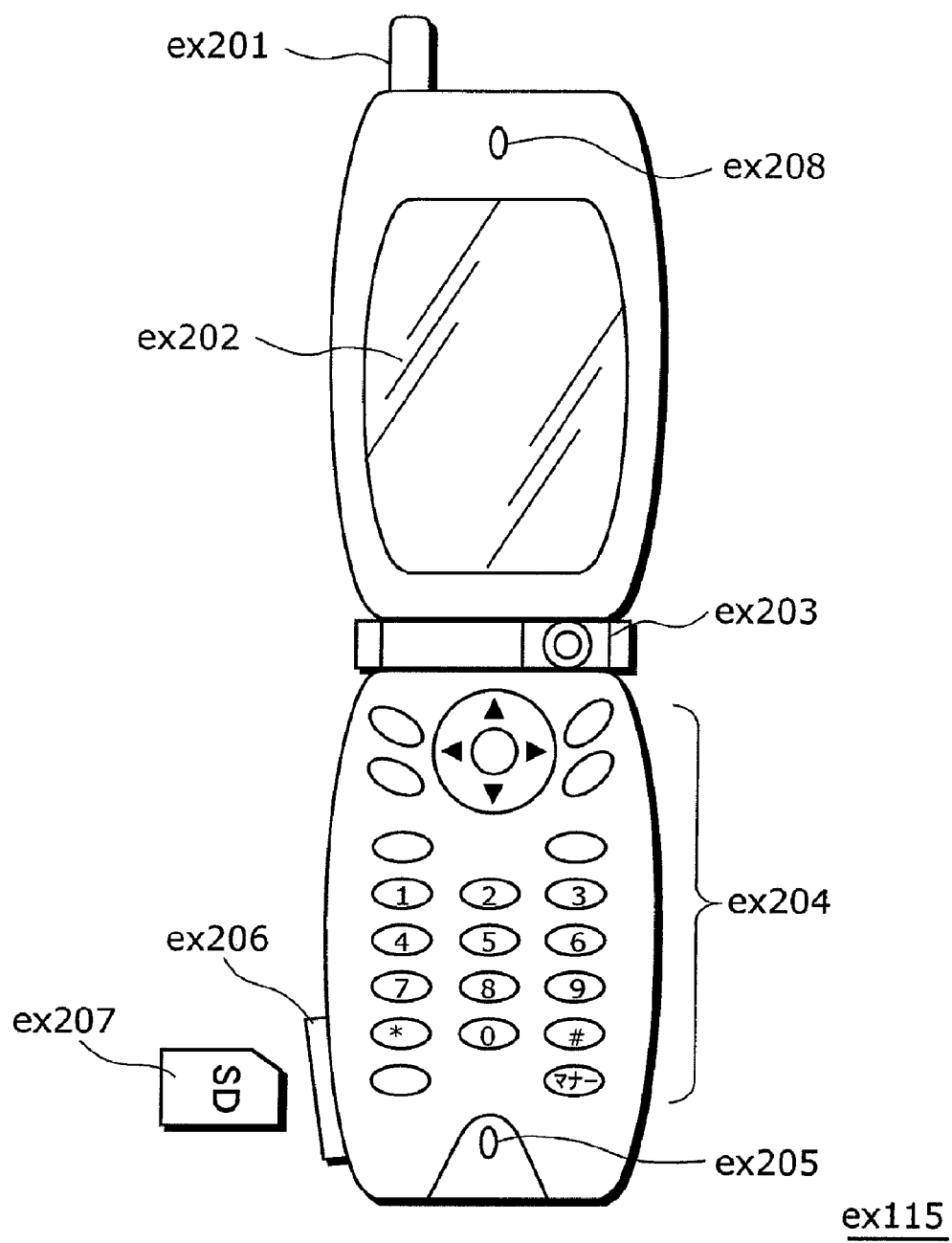
FIG. 16 is an external view of a mobile phone including the image recognition device according to the present invention.

FIG. 16 is an external view of a mobile phone ex115 including the image recognition device described in the Embodiment. The mobile phone ex115 has an antenna ex201 for communicating with the base station ex110 via radio waves, a camera unit ex203 such as a CCD camera capable of shooting videos and still images, a display unit ex202 such as a liquid crystal display which displays videos shot by the camera unit ex203, video and the like received by the antenna ex201, a body unit including a set of operation keys ex204, a voice output unit ex208 such as a speaker for outputting voices, a voice input unit ex205 such as a microphone for inputting voices, a recording medium ex207 for recording shot videos or still images, and a slot unit ex206 which allows attachment of the recording medium ex207 into the mobile phone ex115. The recording medium ex207 is equipped with a flash memory element, a kind of Electrically Erasable and Programmable Read Only Memory (EEPROM) that is an electrically erasable and rewritable nonvolatile memory, in a plastic case such as an SD card.

Figure 17:
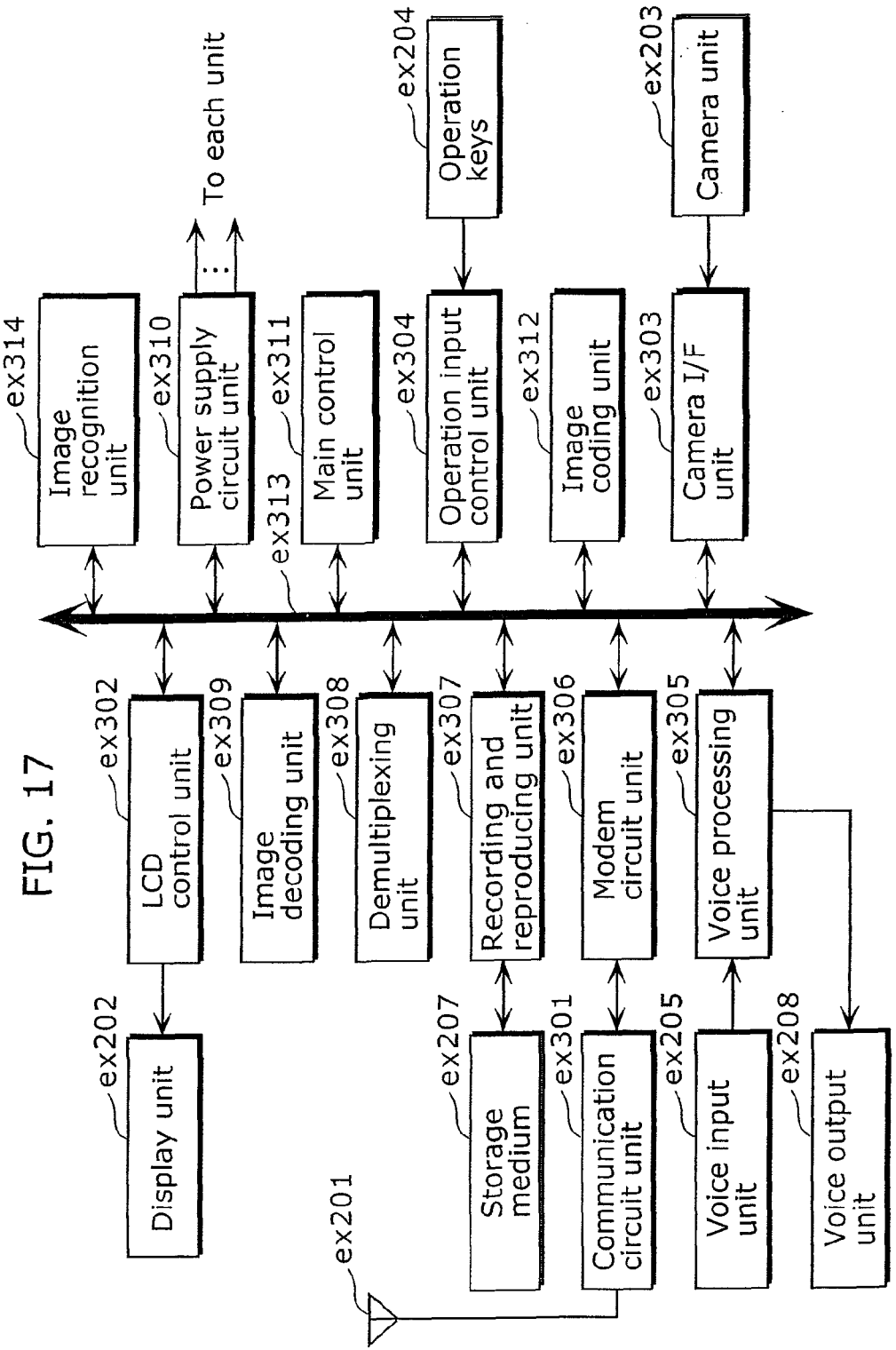
FIG. 17 is a functional block diagram of the mobile phone including the image processing device according to the present invention.

The functional blocks of the mobile phone ex115 are as shown in FIG. 17. In the cellular phone ex115, a main control unit ex311, which is configured to perform centralized control on each unit of the body unit including the display unit ex202 and operation keys ex204, is connected, via a synchronous bus ex313a, with: a power supply circuit unit ex310, an operation input control unit ex304, an image coding unit ex312, a camera interface unit ex303, a liquid crystal display (LCD) control unit ex302, an image decoding unit ex309, a demultiplexing unit ex308, a recording and reproducing unit ex307, a modem circuit unit ex306, an image recognition unit ex314, and a voice processing unit ex305.

When a power key is turned ON by a user's operation, the power supply circuit unit ex310 supplies respective components with power from a battery pack so as to activate the digital mobile phone with a camera ex115 into a ready state.

In the mobile phone ex115, the voice processing unit ex305 converts the voice signals received by the voice input unit ex205 in conversation mode into digital voice data under control of the main control unit ex311 including a CPU, a ROM and a RAM, the modem circuit unit ex306 performs spread spectrum processing of the digital voice data, and the communication circuit unit ex301 performs digital-to-analog conversion and frequency transform of the data so as to transmit it via the antenna ex201. In addition, in the mobile phone ex115, the communication circuit unit ex301 amplifies the signal received by the antenna ex201 in conversation mode and performs frequency transform and analog-to-digital conversion on the signal, the modem circuit unit ex306 performs inverse spread spectrum processing of the signal, and the voice processing unit ex305 converts it into analog voice signal so as to output the resulting voice via the voice output unit ex208.

Furthermore, when transmitting e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform on it, the data is transmitted to the base station ex110 via the antenna ex201.

When image data is transmitted in data communication mode, the image data shot by the camera unit ex203 is supplied to the image coding unit ex312 via the camera interface unit ex303. When the image data is not transmitted, it is also possible to display the image data shot by the camera unit ex203 directly on the display unit ex202 via the camera interface unit ex303 and the LCD control unit ex302.

The image coding unit ex312, compresses and encodes the image data supplied from the camera unit ex203 using the coding method for use with the video coding device as described in the Embodiment so as to transform it into coded image data, and sends it out to the demultiplexing unit ex308. At this time, the mobile phone ex115 sends out the voices received by the voice input unit ex205 during shooting by the camera unit ex203 to the demultiplexing unit ex308 as digital voice data via the voice processing unit ex305.

The demultiplexing unit ex308 multiplexes the coded image data supplied from the image coding unit ex312 and the voice data supplied from the voice processing unit ex305 using a predetermined method. The modem circuit unit ex306 performs spread spectrum processing on the multiplexed data obtained as a result of the multiplexing. The communication circuit unit ex301 performs digital-to-analog conversion and frequency transform of the data so as to transmit the converted data via the antenna ex201.

As for receiving data of a video file which is linked to a Web page or the like in data communication mode, the modem circuit unit ex306 performs spread spectrum processing of the data in the signal received from the base station ex110 via the antenna ex201, and sends out the multiplexed data obtained as a result of the processing to the demultiplexing unit ex308.

In order to decode the multiplexed data received via the antenna ex201, the demultiplexing unit ex308 separates the multiplexed data into a bitstream of image data and a bitstream of voice data, and supplies the current coded image data to the image decoding unit ex309 and the current voice data to the voice processing unit ex305 respectively via the synchronous bus ex313.

Next, the image decoding unit ex309 decodes the bitstream of image data using the decoding method corresponding to the coding method as shown in the Embodiment to generate video data to be reproduced, and supplies this data to the display unit ex202 via the LCD control unit ex302, thereby displaying, for instance, video data included in a video file linked to a Web page. At the same time, the voice processing unit ex305 converts the voice data into an analog voice signal, and supplies this signal to the voice output unit ex208, thereby, for instance, reproducing voice data included in a video file linked to a Web page.

In addition, the image recognition unit ex314 is an image recognition device according to the present invention and performs image recognition of images shot by the camera unit ex203 and images read out from the recording medium ex207.

In this way, the image recognition method shown in the Embodiment can be used in any of the above-mentioned devices and system, and thus it can provide the above-described advantageous effects when used.

In addition, each of the functional blocks in the block diagrams shown in the Embodiment and its Variations is typically achieved in the form of an LSI which is an integrated circuit. These LSIs may be integrated into a single chip, or maybe implemented as plural chips (for example, the functional blocks other than the memory may be integrated into a single chip). It is to be noted that each of the integrated circuits used here is called LSI, but it may also be called IC, system LSI, super LSI, or ultra LSI depending on the degree of integration. Moreover, ways to achieve integration are not limited to the LSIs, and special circuits or general purpose processors and so forth can also achieve the integration. A field programmable gate array (FPGA) that can be programmed after manufacturing an LSI or a reconfigurable processor that allows re-configuration of the connection or settings of the circuit cells inside the LSI can be used for the same purpose.

Furthermore, if advanced semiconductor technology and technology derived therefrom are applied to a technique of manufacturing integrated circuits which replace LSIs in the future, the functional blocks may be integrated using the technique as a matter of course. Application of biotechnology is one such possibility.

In addition, the respective functional blocks in the block diagrams and flowcharts shown in the Embodiment and the Variations may be implemented as hardware such as exclusive circuits, and the central part may be implemented as a processor and a program.

In addition, the present invention is not limited to the above-described Embodiment and Variations, and various modifications, corrections, and combinations are possible within the scope of the present invention.

INDUSTRIAL APPLICABILITY

The present invention can be implemented as image recognition devices which output, as a recognition result, information indicating what an input image is; representatives of the devices include digital cameras with an image shooting function, mobile phones, and personal computers. The present invention can also be implemented as landscape labeling devices, and as analysis devices which shoot objects such as flowers, trees, and insects, and support detailed on-site analyses.

The invention claimed is:

1. An image recognition device which outputs, as a recognition result, information indicating what an input image is, said image recognition device comprising:
   a processor;
   an image input unit configured to obtain the input image which is a target image to be recognized;
   a similar image search unit configured to (i) search out a plurality of similar images which are similar to the target image obtained by said image input unit from among images generated independently of said image recognition device, stored in a server device accessible via the Internet, and unintentionally obtained, and (ii) calculate a similarity between each of the similar images and the target image;
   a keyword extraction unit configured to (i) extract a plurality of keyword sets each of which includes one or more keywords which are candidates for the recognition result of the target image, from attached information which is attached to each of the similar images searched out by said similar image search unit, and (ii) store each of the keyword sets of the respective similar images, in association with the similarity of a corresponding one of the similar images calculated by said similar image search unit;
   a keyword analysis unit configured to (i) calculate weights of the respective keywords in each of the keyword sets extracted by said keyword extraction unit, the weights of the respective keywords in each of the keyword sets being based on the similarity between the target image and each of the similar images associated with a corresponding one of the keyword sets, and (ii) calculate sums of the weights of the respective keywords in each of the keyword sets; and
   a presentation unit configured to output a plurality of the keywords in a descending order of the sums of the weights, the plurality of keywords being output as the candidates for the recognition result of the target image.

2. The image recognition device according to claim 1, wherein said similar image search unit is configured to search out an image included in an Exif file as one of the plurality of similar images, and
   said keyword extraction unit is configured to extract the keyword sets from header information in the Exif file.

3. The image recognition device according to claim 1, wherein said similar image search unit is configured to search out at least one of the plurality of similar images from a Web page on the server device, and
   said keyword extraction unit is configured to extract the plurality of keyword sets using, as a clue, tag information included in either the Web page or an other Web page associated with the Web page.

4. The image recognition device according to claim 1, wherein said similar image search unit is configured to search out at least one of the plurality of similar images from a Web page on the server device, and
   said keyword extraction unit is configured to extract, as each of the keywords which are included in the keyword sets, a peripherally-positioned word or phrase included in the Web page or an other Web page associated with the Web page.

5. The image recognition device according to claim 1, further comprising
   an image specification unit configured to obtain a specification of a target area to be recognized within the target image obtained by said image input unit,
   wherein said similar image search unit is configured to search out at least one similar image similar to a sub-image included in the target area obtained by said image specification unit.

6. The image recognition device according to claim 1, further comprising:
   a classification database in which information indicating an association between each of image templates and a category of the image template are stored; and
   a simple classification unit configured to determine the category of the target image by verifying the target image obtained by said image input unit with each of the image templates stored in said classification database,
   wherein said similar image search unit is configured to search out at least one similar image which is similar to the target image and belongs to the category obtained as a result of the category determination made by said simple classification unit, using the result of the category determination as a keyword for search.

7. The image recognition device according to claim 1, further comprising:
   a detailed information database in which attached information of each of target image candidates and detailed information of the attached information are stored in an associated manner; and
   a pre-processing unit configured to obtain the attached information attached to the target image obtained by said image input unit, and obtain the detailed information of the attached information attached to the target image obtained by said image input unit by verifying the obtained attached information with the attached information registered in said detailed information database,
   wherein said similar image search unit is configured to search out at least one similar image which is similar to the target image and relates to the detailed information obtained by said pre-processing unit using the detailed information as a keyword for search.

8. The image recognition device according to claim 7, wherein each of the target image candidates is a shot image,
   the attached information attached to each of the target image candidates indicates a geographical location at which the target image candidate was shot, and
   the detailed information database includes, as the detailed information, information identifying a landmark located at or around the geographical location.

9. The image recognition device according to claim 8, wherein the target image obtained by said image input unit is included in an Exif file, and
   said pre-processing unit is configured to obtain the attached information from header information of the Exif file including the target image.

10. An image recognition method for outputting, as a recognition result, information indicating what an input image is, said image recognition method comprising:

obtaining the input image which is a target image to be recognized;

searching out a plurality of similar images which are similar to the target image obtained in said obtaining from among images generated independently of said image recognition method, stored in a server device accessible via the Internet, and unintentionally obtained;

calculating a similarity between each of the similar images and the target image;

extracting a plurality of keyword sets each of which includes one or more keywords which are candidates for the recognition result of the target image, from attached information which is attached to each of the similar images searched out in said searching out;

storing each of the keyword sets of the respective similar images, in association with the similarity of a corresponding one of the similar images calculated in said calculating;

calculating weights of the respective keywords in each of the keyword sets extracted in said extracting, the weights of the respective keywords in each of the keyword sets being based on the similarity between the target image and each of the similar images associated with a corresponding one of the keyword sets;

calculating sums of the weights of the respective keywords in each of the keyword sets; and outputting a plurality of the keywords in a descending order of the sums of the weights, the plurality of keyword being output as the candidates for the recognition result of the target image.

11. A program recorded on a non-transitory computer-readable recording medium, said program causing a computer to execute the steps included in the image recognition method according to claim 10.

* * * * *